(12) United States Patent
Wang

(10) Patent No.: US 10,721,545 B2
(45) Date of Patent: Jul. 21, 2020

(54) METHOD AND DEVICE FOR COMBINING VIDEOS

(71) Applicant: Lenovo (Beijing) Co., Ltd., Beijing (CN)

(72) Inventor: Jun Wang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/651,129

(22) Filed: Jul. 17, 2017

(65) Prior Publication Data

US 2018/0027308 A1 Jan. 25, 2018

(30) Foreign Application Priority Data

Jul. 25, 2016 (CN) .......................... 2016 1 0592046

(51) Int. Cl.
| | |
|---|---|
| *H04N 21/85* | (2011.01) |
| *G11B 27/10* | (2006.01) |
| *H04N 21/43* | (2011.01) |
| *H04N 21/439* | (2011.01) |
| *H04N 21/414* | (2011.01) |
| *H04N 5/262* | (2006.01) |
| *G11B 27/031* | (2006.01) |
| *H04N 21/44* | (2011.01) |
| *H04N 21/435* | (2011.01) |
| *H04N 21/234* | (2011.01) |
| *H04N 5/265* | (2006.01) |

(52) U.S. Cl.
CPC ............ *H04N 21/85* (2013.01); *G11B 27/031* (2013.01); *G11B 27/10* (2013.01); *H04N 5/262* (2013.01); *H04N 21/41407* (2013.01); *H04N 21/4302* (2013.01); *H04N 21/4307* (2013.01); *H04N 21/4394* (2013.01)

(58) Field of Classification Search
USPC .................. 386/278–290, 200–224, 239–248
See application file for complete search history.

(56) References Cited

U.S. PATENT DOCUMENTS

| | | | | |
|---|---|---|---|---|
| 8,111,326 | B1 * | 2/2012 | Talwar | H04N 5/765 348/14.08 |
| 8,917,355 | B1 * | 12/2014 | Mo | H04N 21/4394 348/38 |
| 2010/0077289 | A1 * | 3/2010 | Das | G06F 17/30265 715/230 |
| 2013/0188923 | A1 * | 7/2013 | Hartley | H04N 9/87 386/241 |
| 2015/0222815 | A1 * | 8/2015 | Wang | G11B 27/031 348/36 |
| 2015/0318020 | A1 * | 11/2015 | Pribula | H04N 21/43615 386/227 |
| 2016/0196477 | A1 * | 7/2016 | Wang | G06T 5/002 382/167 |
| 2016/0366330 | A1 * | 12/2016 | Boliek | G06F 3/0484 |

FOREIGN PATENT DOCUMENTS

| | | |
|---|---|---|
| CN | 104012106 A | 8/2014 |
| EP | 2450898 A1 | 5/2012 |

\* cited by examiner

*Primary Examiner* — Hung Q Dang
(74) *Attorney, Agent, or Firm* — Anova Law Group, PLLC

(57) ABSTRACT

A method includes acquiring a plurality of raw video files, obtaining video signals and audio signals from the raw video files, determining a sound feature from the audio signals, and combining the raw video files based on the sound feature to generate a combined video file.

16 Claims, 4 Drawing Sheets

METHOD AND DEVICE FOR COMBINING VIDEOS

CROSS-REFERENCE TO RELATED APPLICATION

This application claims priority to Chinese Patent Application No. 201610592046.6, filed on Jul. 25, 2016, the entire contents of which are incorporated herein by reference.

TECHNICAL FIELD

The present disclosure relates to the audio-video processing technology and, more particularly, to a method and device for combining videos.

BACKGROUND TECHNOLOGIES

Sometimes, videos from multiple electronic devices may need to be combined into one video. For example, during video shooting, multiple electronic devices may be used to record one or more objects in a scene. The videos recorded by the multiple electronic devices may need to be combined and then the combined video can be played. However, existing video combining software requires manual synchronization and the synchronization result is not ideal. For example, time delay may exist among multiple videos in the same frame and the time delay may be long.

SUMMARY

In accordance with the disclosure, there is provided a method includes acquiring a plurality of raw video files, obtaining video signals and audio signals from the raw video files, determining a sound feature from the audio signals, and combining the raw video files based on the sound feature to generate a combined video file.

Also in accordance with the disclosure, there is provided a device including a decoder and processor coupled to the decoder. The decoder acquires a plurality of raw video files and obtains video signals and audio signals from the raw video files. The processor determines a sound feature from the audio signals and combines the raw video files based on the sound feature to generate a combined video file.

DESCRIPTION OF EMBODIMENTS

Hereinafter, embodiments consistent with the disclosure will be described with reference to the drawings, which are merely examples for illustrative purposes and are not intended to limit the scope of the disclosure. Wherever possible, the same reference numbers will be used throughout the drawings to refer to the same or like parts.

Embodiments consistent with the disclosure include methods and devices for combining videos. A method or device according to the disclosure can be implemented in an electronic apparatus having image processing function, such as an image processor, a computer, a laptop, or a tablet. Hereinafter, video files to be combined are also referred to as "raw video files" and a video file created by combining the raw video files is also referred to as a "combined video file."

Figure 1:
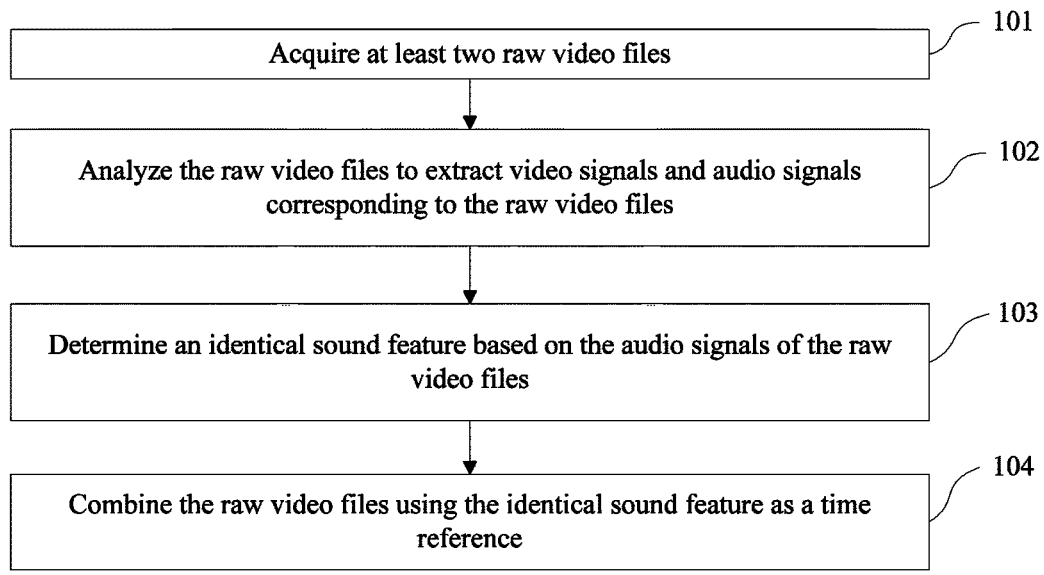
FIG. 1 is a flow chart of an example of a video combining method consistent with embodiments of the disclosure.

FIG. 1 is a flow chart of an example of a video combining method consistent with embodiments of the disclosure. As shown in FIG. 1, at 101, at least two raw video files are acquired. A raw video file can include both a video signal and an audio signal. Usually, the video signal and the audio signal from a same raw video file are already synchronized. In some embodiments, the at least two raw video files can be recorded by at least two different electronic devices. Each of the electronic devices can be an electronic device having the video recording function, such as a tablet, a laptop, a mobile phone, a TV, a camera, or a camcorder.

In some embodiments, the raw video files can contain records of a same scene captured at a same time. For example, on a bus having a group of kids, two electronic devices can be used to record the activities of the same group of kids at the same time. During post production, the raw video files obtained by the two electronic devices can be combined.

In some other embodiments, the raw video files can contain records of different scenes captured at a same time. For example, on a bus having a group of kids, one electronic device can be used to record the activities of the kids sitting on the left and, at the same time, another electronic device can be used to record the activities of the kids sitting on the right. During post production, the raw video files obtained by the two electronic devices can be combined.

At 102, the raw video files are analyzed to extract video signals and audio signals corresponding to the raw video files, respectively. For example, a raw video file can be decoded using a video decoder to extract a video signal and an audio signal corresponding to the raw video file.

In some embodiments, before the raw video files are analyzed, formats of the raw video files can be acquired and checked to determine whether the formats are a preset format. If the format of any of the raw video files is not the preset format, the format of that raw video file can be converted to the preset format. In some embodiments, the preset format can be a format supported by the video decoder. Unifying the formats of different raw video files facilitates the subsequent decoding of the raw video files. That is, the video decoder can use a same analysis method for different raw video files. This reduces the error caused by different formats of the raw video files and better supports the subsequent video combining process.

At 103, an alike sound feature is determined based on the audio signals of the raw video files. The alike sound feature may refer to a sound feature, e.g., a vocal sentence, generated by a same sound source and existing in all of the raw video files, albeit being recorded by different electronic devices. The alike sound feature can be used as a reference in the subsequent video combining process. In some embodiments, determining the alike sound feature can include obtaining audio data corresponding to the audio signals and determining the alike sound feature based on the audio data corresponding to the audio signals.

At 104, the raw video files are combined using the alike sound feature as a time reference. In some embodiments, a first time point can be determined based on the alike sound feature. The video data and the audio data in the raw video files can be synchronized using the first time point as a center point. That is, the video data and the audio data in the raw video files can be synchronized with reference to the first time point, which can also be referred to as a "reference time point." As such, at least the video data corresponding to the alike sound feature can be synchronized in the combined video file.

In some embodiments, to synchronize the video data and the audio data in the raw video files using the first time point as the center point, a video data frame and an audio data frame corresponding to the first time point can be obtained from each of the raw video files. The video data frames and the audio data frames corresponding to the first time point from respective raw video files can be aligned. That is, the video data frames corresponding to the first time point from the respective raw video files can be aligned with each other, and the audio data frame corresponding to the first time point from the respective raw video files can be aligned with each other. Further, to align other portions of the raw video files, one or more second time points can be determined using the first time point as the center point. The second time points can also be referred to as "auxiliary time points." A video data frame and an audio data frame corresponding to each of the one or more second time points can be obtained from each of the raw video files. For each of the one or more second time points, the corresponding video data frames and the corresponding audio data frames from the respective raw video files can be aligned.

In some embodiments, each of the one or more second time points may include another alike sound feature, which may be different from the alike sound feature at the first time point.

Figure 2:
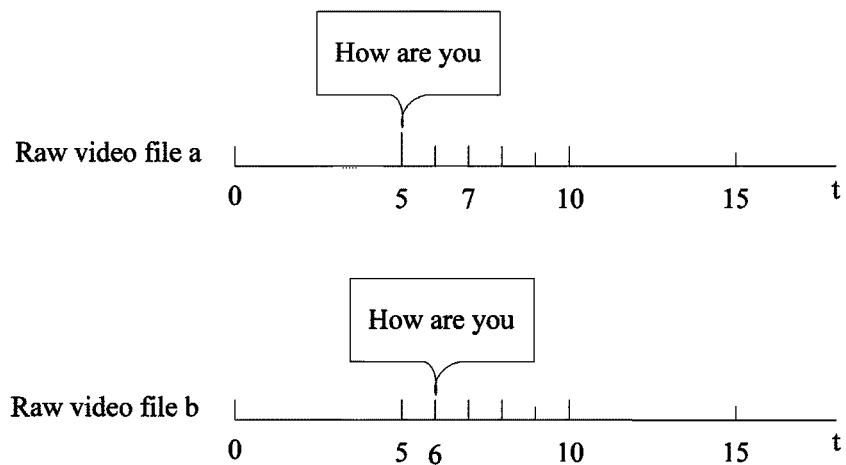
FIG. 2 is a diagram showing an example of audio data of different video files on a time axis consistent with embodiments of the disclosure.

For example, an electronic device A and an electronic device B videotaped multiple people in a same scene at a same time. The electronic device A generates a raw video file a and the electronic device B generates a raw video file b. As shown in FIG. 2, an analysis of the raw video file a reveals that the audio data at the fifth second of the raw video file a includes a sentence "how are you," and an analysis of the raw video file b reveals that the audio data at the sixth second of the raw video file b also includes the sentence "how are you." The two sentences of "how are you" in the two raw video files are said by a same person at a same time. This indicates that a time delay existed when the two electronic devices were videotaping the scene. Thus, if the raw video files are combined by merely aligning the video data frames and the audio data frames according to the recording times of the two raw video files without analyzing the content of the audio data, the combined video file may not be synchronized, i.e., a time delay may exist. However, according to the technical solutions consistent with the disclosure, an audio data frame of the raw video file a at the fifth second is combined with an audio data frame of the raw video file b at the sixth second, and a video data frame of the raw video file a at the fifth second is combined with a video data frame of the raw video file b at the sixth second. As such, in the combined video file, the video data corresponding to the alike sound feature can be synchronized.

Sometimes, the video data frames in the raw video files and/or the audio data frames in the raw video files may not have a one-on-one correspondence. For example, during the analysis of one or more of the raw video files, some frames (either video data frames or audio data frames, or both) may be lost. In this situation, even if the video data frame and the audio data frame at the first time point of one of the raw video files are aligned with the video data frame and the audio data frame at the first time point of another one of the raw video files, and the other video and audio data frames of the raw video files are aligned with the first time point as the center point, parts of the video signals and/or parts of the audio signals in the raw video files may not be synchronized due to the loss of frames. Further synchronization based on other parts of the raw video files may be performed, as described below.

For example, in some embodiments, a plurality of alike sound features may be determined based on the audio signals of the raw video files. One of the alike sound features can be used to determine the first time point as described above. In some embodiments, a third time point can be determined based on another one of the alike sound feature that is different from the alike sound feature corresponding to the first time point. After the raw video files are combined using the first time point as the center point, the combined video file is checked to determine whether the frames of the alike sound feature corresponding to the third time point from the respective raw video files are properly aligned. If not, the raw video files are re-combined. The third time point can thus also be referred to as a "checking time point." For example, the audio data frames corresponding to the third time point from the respective raw video files can be checked to determine whether they are properly aligned.

Figure 3:
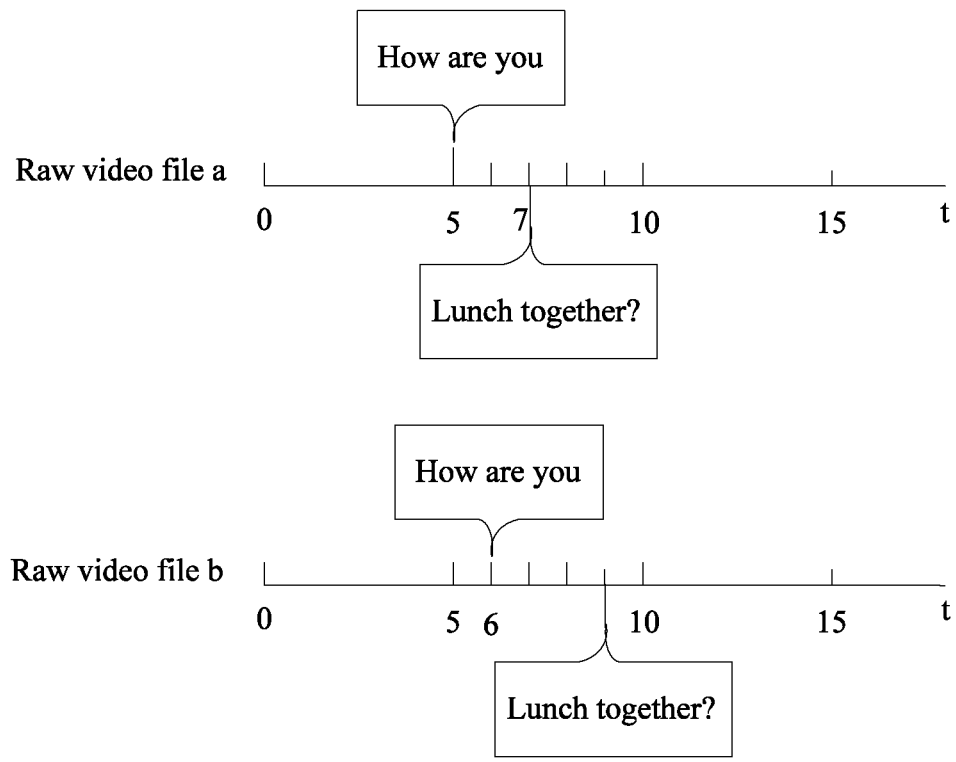
FIG. 3 is a diagram showing another example of audio data of different video files on a time axis consistent with embodiments of the disclosure.

For example, the electronic device A and the electronic device B videotaped multiple people in the same scene at the same time. The electronic device A generates the raw video file a and the electronic device B generates the raw video file b. As shown in FIG. 3, the analysis of the raw video file a reveals that the audio data at the fifth second of the raw video file a includes the sentence "how are you," and the analysis of the raw video file b reveals that the audio data at the sixth second of the raw video file b also includes the sentence "how are you." The two sentences of "how are you" in the two raw video files are said by the same person at the same time. Further, the analysis of the raw video file a also reveals that the audio data at the seventh second of the raw video file a includes a sentence "lunch together?" and the analysis of the raw video file b also reveals that the audio data at the ninth second of the raw video file b also includes the sentence "lunch together?" The two sentences of "lunch together?" in the two raw video files are said by a same person at a same time. In this situation, if the raw video files are combined by aligning the video data frames corresponding to the sentence "how are you" and then aligning other video data frames and audio data frames using the time point corresponding to the sentence "how are you" as the center point, some video data and audio data may not be synchronized. Thus, in this example, the video data frames from the two raw video files that correspond to the sentence "lunch together?" can also be aligned. After that, the combined video file can be further checked using the time point corresponding to the sentence "lunch together?" as a center point. Such a process can be repeated until the video data frames from the two raw video files that correspond to each one of the alike sound features are synchronized, i.e., properly aligned.

Using multiple alike sound features for aligning and checking, as described above, can avoid the problem of asynchronization in parts of the video signals or audio signals caused by, for example, loss of frames. As such, the raw video files can be more properly combined.

In some embodiments, metadata of the combined video file can be generated based on metadata of the at least two raw video files. The metadata can be, for example, a subtitle. In some embodiments, new metadata can be created based on the metadata of the at least two raw video files as the metadata of the combined video file. The new metadata can be created by generalizing or summing the metadata of the at least two raw video files. In some embodiments, a primary raw video file can be determined from the at least two raw video files, and metadata of the primary raw video file can be determined as the metadata of the combined video file, while metadata of other one(s) of the at least two raw video files can be deleted from the combined video file. In some embodiments, all or part of the metadata of the other one(s) of the at least two raw video files is kept as the metadata of the combined video file, while the metadata of the primary raw video file is deleted from the combined video file.

In some embodiments, combining the at least two raw video files can include displaying video images corresponding to the video data of the respective raw video files in a first area of a screen according to a predetermined manner. For example, the predetermined manner can be cascading (e.g., cascading the video images of the raw video files from the upper left corner to the lower right corner of the first area), tiling (e.g., automatically adjusting sizes of windows for displaying the video images of the raw video files such that the windows can completely fill the first area of the screen in a tiling manner), or embedding (e.g., displaying the video images of the raw video files in a picture-in-picture manner by embedding one video image in another video image). According to the actual application, the predetermined manner can include another manner not explicitly listed above.

Consistent with embodiments of the disclosure, at least two raw video files can be acquired and analyzed to extract video signals and audio signals corresponding to the raw video files, respectively. An alike sound feature can be determined based on the audio signals of the raw video files and the raw video files can be combined using the alike sound feature as a time reference. As such, multiple video signals can be synchronized without additional hardware cost and the asynchronization problem in a combined video file caused by time delay can be solved.

Figure 4:
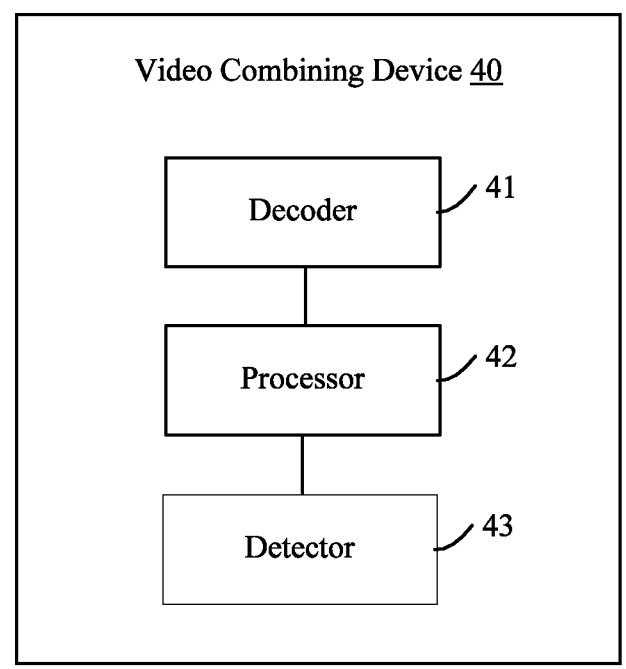
FIG. 4 is a structural diagram of an example of a video combining device consistent with embodiments of the disclosure.

FIG. 4 is a structural diagram of an example of a video combining device 40 consistent with embodiments of the disclosure. As shown in FIG. 4, the video combining device 40 includes a decoder 41 and a processor 42. The decoder 41 acquires at least two raw video files and analyzes the raw video files to obtain a video signal and an audio signal corresponding to each of the raw video files. The processor 42 determines an alike sound feature based on the audio signals of the raw video files and combines the raw video files using the alike sound feature as a time reference.

In some embodiments, the processor 42 can obtain audio data corresponding to the audio signals and determine the alike sound feature based on the audio data corresponding to the audio signals.

In some embodiments, the processor 42 can determine a first time point based on the alike sound feature, and synchronize the video data and the audio data in the raw video files using the first time point as a center point.

In some embodiments, the processor 42 can obtain a video data frame and an audio data frame corresponding to the first time point from each of the raw video files, and align the video data frames and the audio data frames corresponding to the first time point from respective raw video files. Further, the processor 42 can determine one or more second time points using the first time point as the center point and obtain a video data frame and an audio data frame corresponding to each of the one or more second time points from each of the raw video files. For each of the one or more second time points, the processor 42 can align the corresponding video data frames and the corresponding audio data frames from the respective raw video files.

In some embodiments, as shown in FIG. 4, the video combining device 40 further includes a detector 43 for determining a third time point based on another alike sound feature that is different from the alike sound feature corresponding to the first time point. The detector 43 checks the combined video file to determine whether the frames of the alike sound feature corresponding to the third time point from the respective raw video files are properly aligned. If not, the detector 43 can inform the processor 42 to re-combine the raw video files.

In some embodiments, the processor 42 can further generate metadata of the combined video file based on metadata of the at least two raw video files. For example, the processor 42 can create new metadata as the metadata of the combined video file based on the metadata of the at least two raw video files. As another example, the processor 42 can determine a primary raw video file from the raw video files and determine the metadata of the primary raw video file as the metadata of the combined video file. As a further example, the processor 42 can determine all or part of the metadata of the raw video file(s) other than the primary raw video file as the metadata of the combined video file.

In some embodiments, the processor 42 can display video images corresponding to the video data of the respective raw video files in a first area of a screen according to a predetermined manner.

In some embodiments, the processor 42 can acquire formats of the raw video files and determine whether the formats of the raw video files are a preset format. If the format of any of the raw video files is not the preset format, the processor 42 can convert the format of that raw video file to the preset format.

The functions of the components of the video combining device 40 are similar to the methods described above, and thus detailed description thereof is omitted. The functions can be realized by, for example, logical circuits of the video combining device 40 or software run on the video combining device 40.

In some embodiments, the processor 42 can include, for example, a central processing unit (CPU), a micro controller unit (MCU), a digital signal processor (DSP), or a programmable logic controller (PLC) of the video combining device 40.

The video combining device consistent with the disclosure, such as the video combining device 40 described above, can synchronize multiple video signals without additional hardware cost and can solve the asynchronization problem in a combined video file caused by time delay.

Figure 5:
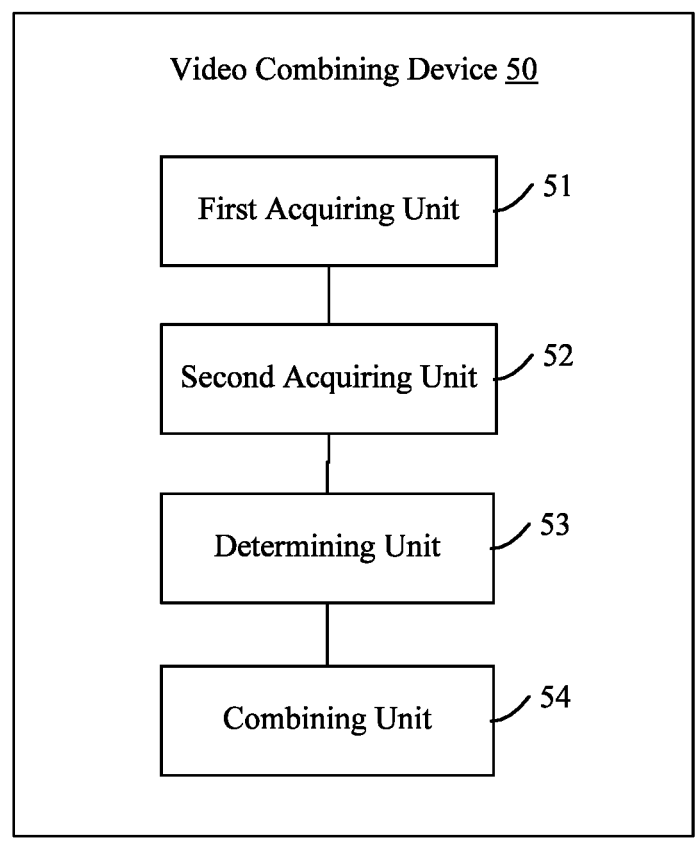
FIG. 5 is a structural diagram of another example of a video combining device consistent with embodiments of the disclosure.

FIG. 5 is a structural diagram of another example of a video combining device 50 consistent with embodiments of the disclosure. As shown in FIG. 5, the video combining device 50 includes a first acquiring unit 51 for acquiring at least two raw video files, a second acquiring unit 52 for analyzing the raw video files to obtain a video signal and an audio signal corresponding to each of the raw video files, a determining unit 53 for determining an alike sound feature based on the audio signals of the raw video files, and a combining unit 54 for combining the raw video files using the alike sound feature as a time reference.

In some embodiments, the determining unit 53 can obtain audio data corresponding to the audio signals and determine the alike sound feature based on the audio data corresponding to the audio signals.

In some embodiments, the combining unit 54 can determine a first time point based on the alike sound feature, and synchronize the video data and the audio data in the raw video files using the first time point as a center point.

In some embodiments, the combining unit 54 can obtain a video data frame and an audio data frame corresponding to the first time point from each of the raw video files, and align the video data frames and the audio data frames corresponding to the first time point from respective raw video files. Further, the combining unit 54 can determine one or more second time points using the first time point as the center point and obtain a video data frame and an audio data frame corresponding to each of the one or more second time points from each of the raw video files. For each of the one or more second time points, the combining unit 54 can align the corresponding video data frames and the corresponding audio data frames from the respective raw video files.

In some embodiments, the combining unit 54 can further determine a third time point based on another alike sound feature that is different from the alike sound feature corresponding to the first time point. The combining unit 54 can check the combined video file to determine whether the frames of the alike sound feature corresponding to the third time point from the respective raw video files are properly aligned. If not, the combining unit 54 can re-combine the raw video files.

In some embodiments, the combining unit 54 can further generate metadata of the combined video file based on metadata of the at least two raw video files. For example, the combining unit 54 can create new metadata as the metadata of the combined video file based on the metadata of the at least two raw video files. As another example, the combining unit 54 can determine a primary raw video file from the raw video files and determine the metadata of the primary raw video file as the metadata of the combined video file. As a further example, the combining unit 54 can determine all or part of the metadata of the raw video file(s) other than the primary raw video file as the metadata of the combined video file.

In some embodiments, the combining unit 54 can display video images corresponding to the video data of the respective raw video files in a first area of a screen according to a predetermined manner.

In some embodiments, the combining unit 54 can acquire formats of the raw video files and determine whether the formats of the raw video files are a preset format. If the format of any of the raw video files is not the preset format, the combining unit 54 can convert the format of that raw video file to the preset format.

The functions of the units of the video combining device 50 are similar to the methods described above, and thus detailed description thereof is omitted. The functions can be realized by, for example, logical circuits of the video combining device 50 or software run on the video combining device 50.

In some embodiments, each of the first acquiring unit 51, the second acquiring unit 52, the determining unit 53, and the combining unit 54 can include, for example, a CPU, an MCU, a DSP, or a PLC of the video combining device 50.

The video combining device consistent with the disclosure, such as the video combining device 50 described above, can synchronize multiple video signals without additional hardware cost and can solve the asynchronization problem in a combined video file caused by time delay.

Figure 6:
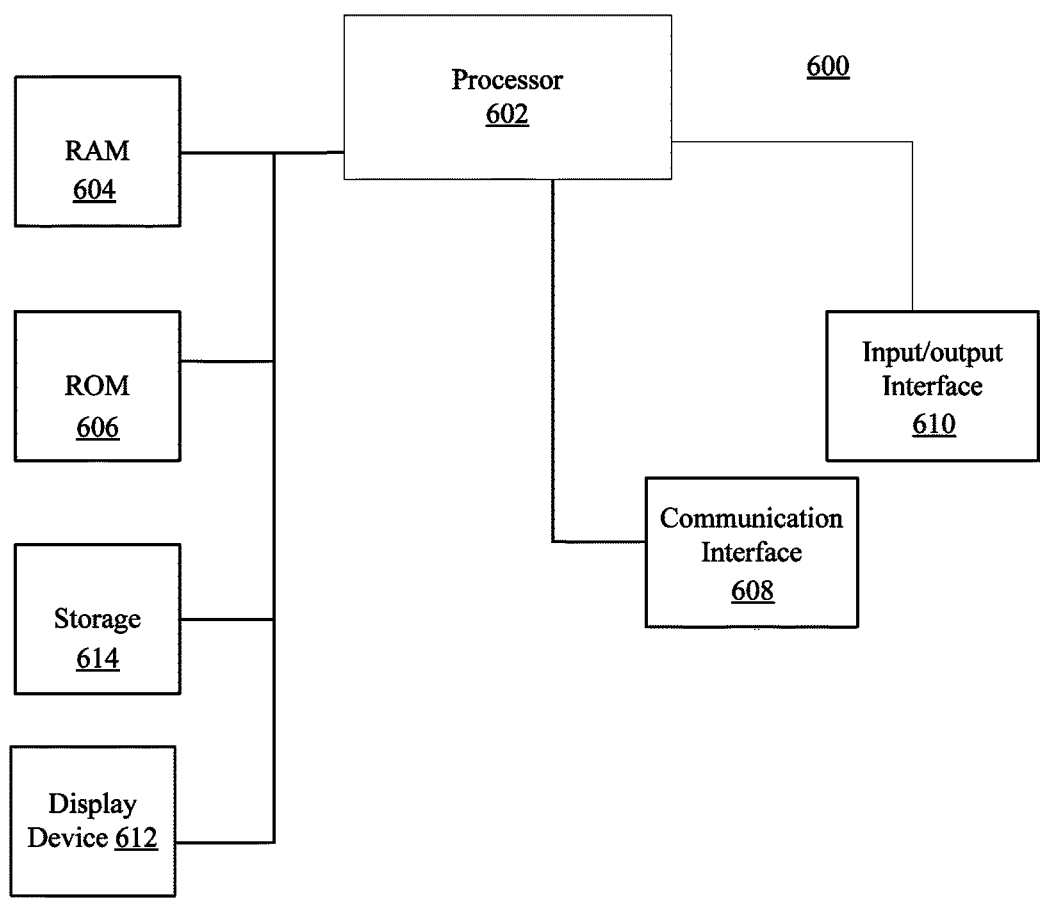
FIG. 6 is a structural diagram of another example of a video combining device consistent with embodiments of the disclosure.

FIG. 6 is a structural diagram of another example of a video combining device 600 consistent with embodiments of the disclosure. The video combining device 600 may include one of a variety of computing devices, such as a server, a personal computer, a mobile phone, a glass-type computing device, a tablet computer, or a notebook computer, or any portable, pocket-sized, handheld, head-mounted, wearable, computer built-in, or vehicle mounted mobile device.

As shown in FIG. 6, the video combining device 600 includes a processor 602, a random access memory (RAM) 604, a read only memory (ROM) 606, a communication interface 608, an input/output interface 610, a display device 612, and a storage 614. Any one or a combination of two or more of the RAM 604, the ROM 606, and the storage 614 can constitute a non-transitory computer-readable storage medium storing instructions that, when executed by the processor 602, cause the processor 602 to execute a method consistent with the disclosure, such as one of the above-described examples of the video combining method. Other components may be added and certain components may be removed without departing from the principles of the disclosed embodiments.

The processor 602 may include, for example, a CPU, a graphic processing unit (GPU), a general purpose microprocessor, a DSP, a microcontroller, or an application specific integrated circuit (ASIC). The processor 602 may execute sequences of computer program instructions to perform various processes associated with the video combining device 600, including a method consistent with the disclosure, such as one of the above-described examples of video combining method. The computer program instructions may be loaded into the RAM 604 for execution by the processor 602 from the ROM 606.

The communication interface 608 may provide communication connections such that the video combining device 600 can be accessed remotely and/or communicate with other systems through computer networks or other communication networks via various communication protocols, such as transmission control protocol/internet protocol (TCP/IP), hypertext transfer protocol (HTTP), etc.

The input/output interface 610 may be provided for users to input information into the video combining device 600 or for the users to receive information from the video combining device 600. For example, the input/output interface 610 may include any appropriate input device, such as a remote control, a keyboard, a mouse, an electronic tablet, voice communication devices, or any other optical or wireless input devices. The input/output interface 610 may also include certain sensors, such as camera(s), eye-trackers, and other types of sensing components to input various user or environmental information to the video combining device 600 for analysis and processing.

The display device 612 may include any appropriate display screen, such as a liquid-crystal display, a light-emitting diode display, a touch panel, or a projector. The display device 612 may be used to display the video images of the combined video file. The storage 614 may include any appropriate type of storage medium, such as a CD-ROM, a hard disk, a flash drive, an optical storage, a DVD drive, or other type of storage devices. During operation of the video combining device 600, the processor 602 may perform certain information processing processes.

In the disclosure, the term "an embodiment" may include relevant features, structures, or characteristics that are not explicitly mentioned or described. Reference to, e.g., "an embodiment," "the embodiment," or "some embodiments," does not necessarily mean the same embodiment or embodiments. The features, structures, or characteristics can be combined as appropriate in one or more embodiments. The reference numerals used in the disclosure do not indicate or imply any particular sequence or order for executing the disclosed processes. The order of the processes should be determined based on their functions and internal logics.

Further, terms "include" and "comprise," and any other alternative forms of such terms, used in the disclosure intend to be nonexclusive. That is, a process, method, article, or device described as including certain elements does not only include the elements that are explicitly listed, but may also include other elements that are not explicitly listed or elements that are inherent to the process, method, article, or device. Other than being explicitly specified, an element following the phrase "including a" does not exclude the existence of another same element in the process, method, article, or device that includes the element.

The disclosed devices and methods can be implemented in other manners. The above-described servers and devices are merely examples. For example, different units may be defined merely according to their logical functions and can be defined according to a different manner. For example, multiple units or components can be combined or integrated into another system, or some features can be omitted or not executed. Further, the coupling, direct coupling, or communication connection between various components can be implemented by interfaces. The indirect coupling or communication connection between various devices or units can be electrical, mechanical, or another form.

Units described as separate components may or may not be physically separated from each other. A component described or shown as a unit may or may not be a physical unit. The units can be located in a same place or distributed on multiple network units. Some or all of the units can be chosen to realize purpose of the disclosure according to actual need.

Further, various functional units can be all integrated in one processing unit or be separate, individual units. Two or more units can be integrated in one unit. A unit can be implemented by hardware or by a combination of hardware and software.

It is understood by persons of ordinary skill in the art that all or some of the processes consistent with the disclosure can be implemented by hardware as instructed by a program, which can be stored in a non-transitory computer-readable storage medium. The program, when executed, can cause, for example, a processor to perform a method consistent with the disclosure, such as one of the examples of the methods described above. The storage medium can include a medium that can store program codes, such as a mobile storage, a read only memory (ROM), a diskette, or a compact disc.

Further, software functional modules for implementing a method consistent with the disclosure can be stored in a non-transitory computer-readable storage medium. Thus, part or all of the technical solutions consistent with the disclosure can be implemented as computer software product stored in a storage medium. The software product may include instructions that can cause computer equipment, such as a personal computer, a server, or network equipment, to perform part or all of a method consistent with the disclosure. The storage medium can include a medium that can store program codes, such as a mobile storage, a ROM, a diskette, or a compact disc.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A method comprising:
   acquiring a first raw video file and a second raw video file;
   obtaining, using a processor, video signals and audio signals from the first raw video file and the second raw video file;
   determining, using the processor, a first sound feature from the audio signals, the first sound feature corresponding to a first time point in the first raw video file and a second time point in the second raw video file;
   combining, using the processor, the first raw video file and the second raw video file to generate a first combined video file by aligning the first time point in the first raw video file with the second time point in the second raw video file;
   determining, using the processor, a second sound feature from the audio signals, the second sound feature being different from the first sound feature and corresponding to a third time point in the first raw video file and a fourth time point in the second raw video file;
   determining, using the processor, that the third time point in the first raw video file and the fourth time point in the second raw video file are not aligned in the first combined video file, wherein an interval between the first time point and the third time point is different from an interval between the second time point and the fourth time point; and
   responsive to determining that the third time point in the first raw video file and the fourth time point in the second raw video file are not aligned in the first combined video file, re-combining, using the processor, the first raw video file and the second raw video file to generate a second combined video file by aligning the first time point in the first raw video file with the second time point in the second raw video file and aligning the third time point in the first raw video file with the fourth time point in the second raw video file.

2. The method of claim 1, wherein determining the first sound feature from the audio signals includes:
   obtaining audio data corresponding to the audio signals; and
   determining the first sound feature from the audio data.

3. The method of claim 1, wherein combining the first raw video file and the second raw video file includes:
   synchronizing video data and audio data of the first raw video file with video data and audio data of the second raw video file, respectively, with reference to the first time point and the second time point and with reference to the third time point and the fourth time point.

4. The method of claim 3, wherein synchronizing the video data and the audio data with reference to the first time point and the second time point includes:
   obtaining a first reference video data frame and a first reference audio data frame corresponding to the first time point from the first raw video file and obtaining a second reference video data frame and a second reference audio data frame from the second raw video file; and aligning the first reference video data frame with the second reference video data frame and aligning the first reference audio data frame with the second reference audio data frame.

5. The method of claim 4, wherein synchronizing the video data and the audio data with reference to the first time point and the second time point further includes:

determining one or more first auxiliary time points based on the first time point and determining one or more second auxiliary time points based on the second time point;

obtaining one or more first video data frames and one or more first audio data frames each corresponding to one of the one or more first auxiliary time points from the first raw video file and obtaining one or more second video data frames and one or more second audio data frames each corresponding to one of the one or more second auxiliary time points from the second raw video file; and aligning the one or more first video data frames with the one or more second video data frames, respectively, and aligning the one or more first audio data frames with the one or more second audio data frames, respectively.

6. The method of claim 1, wherein combining the first raw video file and the second raw video file includes:

displaying video images corresponding to video data of the first raw video file and the second raw video file in a screen according to a predetermined manner.

7. The method of claim 6, wherein the predetermined manner includes one selected from the group consisting of:
cascading the video images in the screen;
tiling the video images in the screen; and
embedding one of the video images in another of the video images.

8. The method of claim 1, further comprising:
acquiring formats of the first raw video file and the second raw video file;
determining whether the formats are a preset format; and
converting, in response to at least one of the formats being not the preset format, the at least one of the formats to the preset format.

9. The method of claim 1, further comprising:
generating subtitle of the combined video file based on part of or all of subtitles of one or more of the first raw video file and the second raw video file.

10. A device comprising:
a decoder, wherein the decoder is configured to:
acquire a first raw video file and a second raw video file; and
obtain video signals and audio signals from the first raw video file and the second raw video file; and
a processor coupled to the decoder, wherein the processor is configured to:
determine a first sound feature from the audio signals, the first sound feature corresponding to a first time point in the first raw video file and a second time point in the second raw video file;
combine the first raw video file and the second raw video file to generate a first combined video file by aligning the first time point in the first raw video file with the second time point in the second raw video file;
determine a second sound feature from the audio signals, the second sound feature being different from the first sound feature and corresponding to a third time point in the first raw video file and a fourth time point in the second raw video file;
determine that the third time point in the first raw video file and the fourth time point in the second raw video file are not aligned in the first combined video file, wherein an interval between the first time point and the third time point is different from an interval between the second time point and the fourth time point; and
responsive to determining that the third time point in the first raw video file and the fourth time point in the second raw video file are not aligned in the first combined video file, re-combine the first raw video file and the second raw video file to generate a second combined video file by aligning the first time point in the first raw video file with the second time point in the second raw video file and aligning the third time point in the first raw video file with the fourth time point in the second raw video file.

11. The device of claim 10, wherein the processor is further configured to:
obtain audio data corresponding to the audio signals; and
determine the first sound feature from the audio data.

12. The device of claim 10, wherein the processor is further configured to:
synchronize video data and audio data of the first raw video file with video data and audio data of the second raw video file, respectively, with reference to the first time point and the second time point and with reference to the third time point and the fourth time point.

13. The device of claim 12, wherein the processor is further configured to:
obtain a first reference video data frame and a first reference audio data frame corresponding to the first time point from the first raw video file and obtains a second reference video data frame and a second reference audio frame from the second raw video file; and
align the first reference video data frame with the second reference video data frame and align the first reference audio data frame with the second reference audio data frame.

14. The device of claim 13, wherein the processor is further configured to:
determine one or more first auxiliary time points based on the first time point and determines one or more second auxiliary time points based on the second time point;
obtain one or more first video data frames and one or more first audio data frames each corresponding to one of the one or more first auxiliary time points from the first raw video file and obtain one or more second video data frames and one or more second audio data frames each corresponding to one of the one or more second auxiliary time points from the second raw video file; and
align the one or more first video data frames with the one or more second video data frames, respectively, and align the one or more first audio data frames with the one or more second audio data frames, respectively.

15. The device of claim 10, wherein the processor is further configured to display video images corresponding to video data of the first raw video file and the second raw video file in a screen according to a predetermined manner.

16. The device of claim 10, wherein the processor further:
acquire formats of the first raw video file and the second raw video file;

determine whether the formats are a preset format; and
convert, in response to at least one of the formats being not the preset format, the at least one of the formats to the preset format.

* * * * *